UNITED STATES PATENT OFFICE.

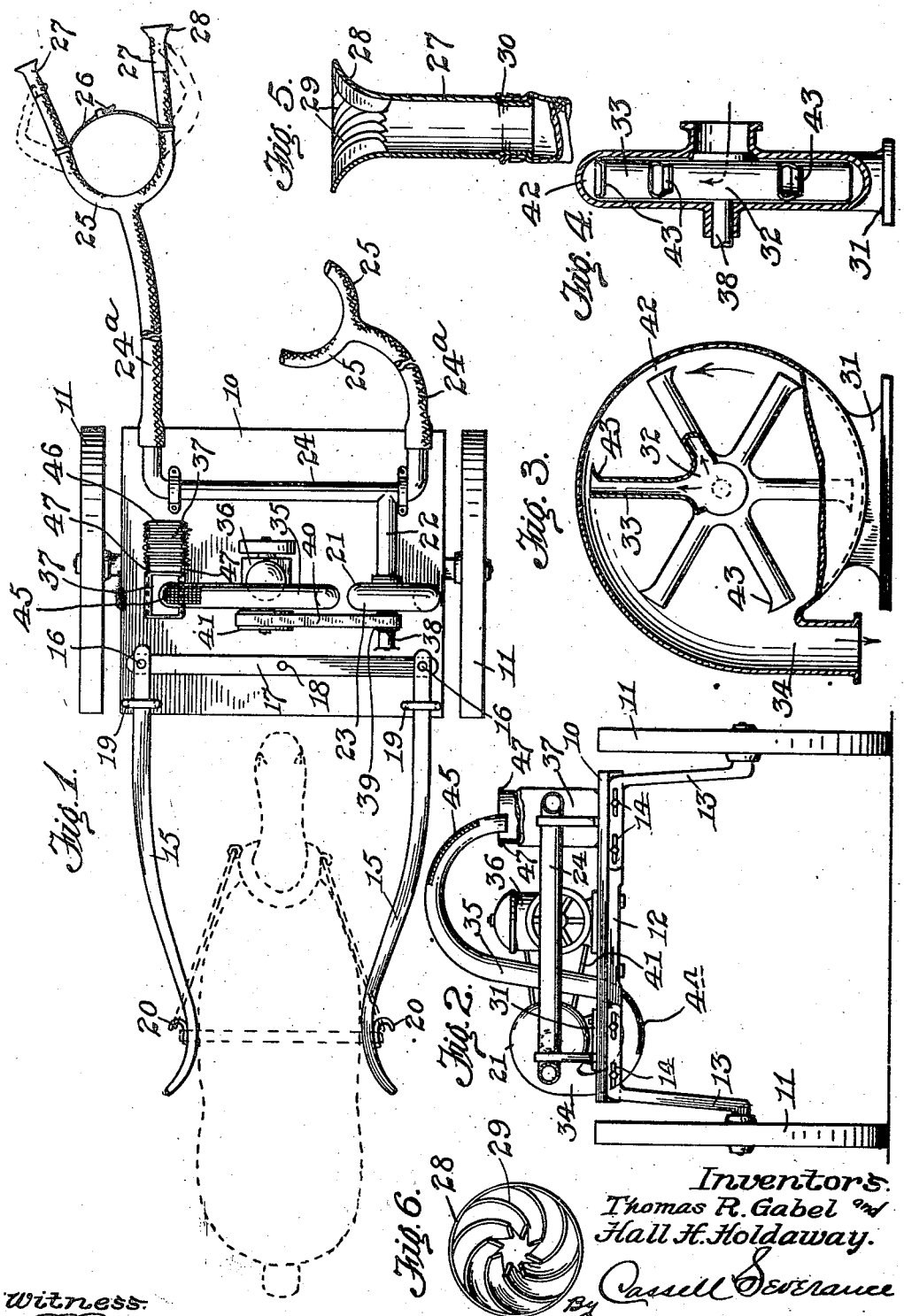

THOMAS RING GABEL AND HALL H. HOLDAWAY, OF LOS ANGELES, CALIFORNIA, ASSIGNORS OF ONE-THIRD TO HENRY P. JONES, OF LOS ANGELES, CALIFORNIA.

COTTON-PICKING MACHINE.

1,277,901.  Specification of Letters Patent.  Patented Sept. 3, 1918.

Application filed August 5, 1916. Serial No. 113,302.

*To all whom it may concern:*

Be it known that we, THOMAS RING GABEL and HALL H. HOLDAWAY, citizens of the United States, residing at Los Angeles, in the county of Los Angeles and State of California, have invented certain new and useful Improvements in Cotton-Picking Machines, of which the following is a specification.

This invention relates to improvements in a cotton picking machine, and particularly such as can be driven through and between the rows of cotton plants, the structure being such that a number of rows of cotton plants may be operated upon at a time.

It is an object of the invention to provide a cotton picking machine suitably mounted upon wheels and capable of being propelled ahead of the horse or team, the operators of the machine keeping in front of the machine and picking the cotton from the plants ahead of the same.

It is also an object of the invention to provide a compact cotton picking machine having upon a portable platform a suitable blower, an engine for operating the same and a cotton collecting device of any suitable character, the suction blower being adapted to draw air through collecting piping and through nozzles of an improved character, which are carried by operators or attendants.

It is a further object of the invention to provide a blower having hollow vanes or blower blades adapted to propel cotton passed through the blower without danger of breaking or injuring the same.

It is a further object of the invention to provide a cotton picking machine having a suitable blower adapted to create a suction in collecting piping and to force the same through a discharge pipe having dust separating means in the walls thereof, means being provided upon the machine for collecting the cotton after it has been thus cleansed.

It is a still further object of the invention to provide a machine of the character described, with cotton picking nozzles having flaring inlets and spiral or screw-like ribs therein adapted to direct the cotton in a rotary manner into the nozzle, whereby the collection of the cotton may be greatly facilitated.

With these and other objects in view, the invention comprises certain novel constructions, combinations and arrangements of parts, as will be hereinafter more fully described and claimed.

In the accompanying drawings:—

Figure 1 is a top plan view of a cotton picking machine embodying the features of this invention.

Fig. 2 is a view partially in vertical cross section, and partially in rear elevation, of the said machine.

Fig. 3 is an enlarged detail sectional view taken centrally through the blower, in a plane at right angles to the shaft thereof.

Fig. 4 is a transverse vertical sectional view taken through the blower, in a plane parallel to the shaft thereof.

Fig. 5 is an enlarged detail sectional view taken longitudinally through one of the cotton picking nozzles of the machine.

Fig. 6 is an end elevation of one of the nozzles, looking into the inlet end thereof.

It is the purpose of the invention to provide a cotton picking machine having means for gathering cotton from a plurality of rows of cotton plants, simultaneously, the machine also being propelled behind the operator by a horse or team arranged to push the mechanism. It is also designed to supply a machine in which the cotton may be drawn into tubing through suitable picker nozzles, by means of a suction derived from a suction fan, the said fan being peculiarly constructed and adapted for the purpose and so formed that it will not break or tear the cotton fiber. The machine is also provided with an engine for driving the suction fan or blower and with means for cleaning and collecting the cotton, in suitable bags or like receptacles. In the accompanying drawing, the preferred embodiment of the invention has been illustrated and the details and features of the said invention will now be more specifically described, reference being had to the said illustration.

In the drawing 10 illustrates the platform of a vehicle, which is mounted upon suitable wheels 11. The wheels are preferably mounted upon an arch shaped axle 12 and the end portions 13 thereof may be made adjustable in any desired manner as at 14, whereby the wheels may be set closer together or farther apart to insure their traveling between the rows of cotton plants. In order that the vehicle may be propelled or pushed in front of the horse or team, the platform 10 is provided with a pair of movable shafts 15 which are brought close together at their outer ends so as to fit approximately against the sides of the horse opposite the saddle or back supporting straps of the harness. The shafts are flared outwardly to a considerable degree in approaching the vehicle, the rear ends of the said shaft being pivoted at 16 to the ends of a swingle tree 17 which is pivoted at 18 upon the platform 10. The shafts 15 also pass between standards or guides 19 upon the vehicle platform so that they are movably held in place with respect to the platform, but in such a manner as to permit the movement of the swingle tree. The shafts when secured to the animal propelling the vehicle may thus accommodate themselves to the twisting of the body when the animal turns in one direction or the other for directing the movement of the vehicle in front of him. The shafts may be provided with hooks 20 to which the harness or short tugs may be fastened for pulling the shafts in the direction of the travel of the animal.

About centrally of the vehicle, is located the mechanism for operating upon the cotton picked. A suction fan or blower 21 is located usually upon one side of the platform 10 and is formed with an inlet suction pipe 22 which enters the central portion of the blower upon one side of the casing 23 thereof. A branch pipe 24 communicates with the pipe 22 and extends laterally across the front end of the platform 10. The opposite ends of the said pipe are connected with flexible tubing 24ª, there usually being at least one of such tubes connected with the said pipe 24. The tube 24ª is made of any desirable length and of flexible material and is formed with branch pipes, in each case as 25, within the fork of which operators may stand and walk for carrying the tubing among the cotton plants. By means of a strap 26 each set of fork tubes, may be strapped around the waist of the operator, whereby the weight of the bulk of the tubing is fastened to the body of the operator. The outer ends of the branch tubes 25 are provided with cotton picking nozzles 27 of any desired formation and the operator can hold one of such picking nozzles in each hand, so that by walking between the rows of cotton, he can reach one or two rows of plants upon each side of him.

The picking nozzles 27 are preferably of simple formation having cylindrical body portions of a diameter of about two or three inches so that they can be held in the hand of the operator. The outer ends of the nozzles are made flaring as at 28 and the inner curved surfaces of said flaring portions are provided with spirally arranged ribs 29. The said ribs project inwardly from the walls of the flaring portion 28 and are made of considerable width, and the long spiral curves upon which the ribs are formed tend to give the air a twisting or whirlpool like action and to facilitate the guiding of the cotton into the smaller body portion of the nozzle. The walls are usually provided with fastening portions 30 at their inner ends to facilitate their being coupled to the ends of the tubes 25. The formation of the suction fan or blower 21 is important. The casing 23 of the said blower is of any general or desired form and is mounted upon any suitable base portion 31 which is fastened upon the platform 10. The blower has its inlet as above intimated, centrally arranged upon one side thereof and connected with the pipe 22. The blower fan is formed with a hollow body portion 32 from which radiate hollow vanes or fan blades 33 which communicate with the central hollow portion 32. The blades are of elongated flattened form in cross section, and are open at their outer ends. The fan vanes turn in the direction of the arrow, and tend to force the air and the cotton carried thereby, through a tangentially arranged outlet 34 at one side of the blower. The outlet preferably extends downwardly and passes through an opening in the platform 10, whence it curves beneath the blower and upwardly through the platform again. The discharge pipe is extended therefrom upwardly as at 35 so as to pass between the blower and the engine 36 which drives the blower. The discharge pipe is passed well above the engine and its outer end is curved downwardly again so that the cotton may be discharged into bags 37 or in any other desired receptacle, usually mounted to one side of the engine, and near the opposite edge of the platform 10 from that occupied by the blower. The fan is closed upon one side opposite the entrance opening and is bolted or otherwise secured to the inner end of a shaft 38 which is mounted in suitable bearings which rise from the platform 10. The shaft 38 is provided between its bearings with a pulley 39 which is connected by a belt 40 with a pulley 41 on the shaft of the engine 36. By reference to Fig. 4 of the drawing, it will be seen that the hollow vanes of the blower are made to fit at the sides, the side walls of the blower, but the said vanes do not extend to the peripheral walls of the blowers, but are made short enough to allow an ample space 42 within the blower walls so that the air and cotton can pass out of the ends of the hollow vanes. The forward walls of the vanes, in the direction in which the vane turns, are preferably straight, but the after walls opposite thereto are preferably curved rearwardly as at 43 so that there is never any danger of the cotton being caught and damaged or torn, at any point within the said blower.

As the blower operates, the air and the cotton carried thereby, are driven from the blower casing into the outlet pipe, and after being given a direction by the curvature of the pipe at the bottom, the cotton is passed over a screened opening in said pipe as at 44, whereby dust and dirt is sifted from the cotton and the larger portion of the dust and dirt will drop from the pipe through said screened opening. At the upper curved portion of the discharge pipe, just before the cotton begins to descend therein, another screened opening as at 45 is provided for further screening and clearing the cotton of dust and dirt.

The cotton as it is discharged from the pipe 35 may be collected in any suitable receptacle. Preferably a standard 46 is mounted upon the platform 10 and provided with forwardly extending arms 47 upon which a number of burlap or other kinds of bags may be threaded and hung loosely. One bag is then drawn outwardly from said arms at a time so as to open it beneath the discharge end of the pipe 35. As fast as the bags are filled with cotton, they are pulled off the ends of the arms 47 and the next one behind is drawn into open position. By this means the cotton can be continuously received from the discharge pipe and the blower can be operated continuously.

The operation of the device will be readily understood in connection with the above description. The wheels of the vehicle are usually run between two rows of cotton, the horses traveling between the two rows which are thus included between the wheels 11.

By having an operator with a pair of nozzles between the next two rows beyond the wheels, each operator can pick cotton from four rows of plants. The vehicle is moved slowly from time to time, giving the operators ample opportunity to reach the cotton in the four rows near him, so that it will be an easy matter for two pickers to take cotton from at least eight rows of plants. Since the vehicle moves slowly and a rein may be carried forwardly to one or the other of the operators, the horse can be readily controlled to operate the vehicle as it is desired and by directing his head to one side or the other, the vehicle can be readily kept in proper position. The engine may be of any desired type, usually of the internal combustion kind and when set in operation may be run continuously. The fan will keep a constant suction in the picker nozzles and the tubing, and pipes leading therefrom to the blower. The cotton will be sucked in with the air which is drawn into the body of the fan and will be forced outwardly through the hollow vanes and into the outlet pipe in a continuous stream. In passing over the screened openings 44 and 45, the cotton will be easily cleared of dust and dirt which might otherwise be deposited in the bag. It will be understood of course that the minor details of construction in the device may be altered, and that mechanical equivalents may be substituted for some of the parts thereof, without departing in the least from the spirit of the invention.

What is claimed is:—

1. In a device of the character referred to, a blower casing having a tangentially arranged outlet and a central opening in its side, a blower fan having hollow vanes and a hollow center in communication with said hollow vanes, said blower fan being of less diameter than the diameter of said casing, whereby to leave a space between the ends of said vanes and the said casing, said hollow vanes having the ends of their rearward walls curved rearwardly, whereby to form a curved discharge from the ends of said vanes.

2. In a device of the character referred to, a blower casing having a tangentially arranged discharge outlet connected with a curved discharge pipe, said discharge pipe having a screening outer wall at its curve, said blower casing having a central opening through one of its sides, a hollow rotor mounted therein and having an open center in register with the opening through the side of said casing, and having hollow vanes, the ends of said vanes having rearwardly curved portions, the diameter of said rotor being less than the diameter of said blower casing, whereby to leave a space between the ends of said rotor vanes and the inner wall of said casing, substantially as described.

3. In a device of the character referred to, a blower casing having a tangentially arranged outlet and a central inlet opening through one of its sides, a hollow rotor mounted therein and having a hollow center opening in register with the central opening through the side of said casing, and having hollow vanes, the ends of which have rearwardly curved portions, whereby to give a curved rearwardly discharge through the ends of said vanes, said vanes being of less diameter than the diameter of said casing, whereby to leave a space between the ends of said vanes and the inside of said casing, substantially as described.

In testimony whereof, we have hereunto set our hands, in presence of two witnesses.

THOMAS RING GABEL,
HALL H. HOLDAWAY.

Witnesses:
DANIEL P. KENDRICK,
CASSELL SEVERANCE.